United States Patent [19]

Stoltz et al.

[11] Patent Number: 4,637,831
[45] Date of Patent: Jan. 20, 1987

[54] PROCESS FOR REDUCTION OF ZIRCONIUM, HAFNIUM OR TITANIUM USING A ZINC OR TIN SEAL

[75] Inventors: Richard A. Stoltz, Murrysville Boro, Pa.; Young J. Kwon, Fruit Heights, Utah

[73] Assignee: Westinghouse Electric Corp., Pittsburgh, Pa.

[21] Appl. No.: 739,418

[22] Filed: May 30, 1985

[51] Int. Cl.⁴ .................................. C22B 34/10
[52] U.S. Cl. ................................ 75/84.5; 75/27
[58] Field of Search ........................ 75/84.5, 27

[56] References Cited

U.S. PATENT DOCUMENTS

| | | | |
|---|---|---|---|
| 2,711,955 | 6/1955 | Jordan | 75/84.5 X |
| 2,732,292 | 1/1956 | Jordan | 75/84.5 X |
| 2,763,542 | 9/1956 | Winter, Jr. | 75/84.5 |
| 2,826,492 | 3/1958 | Morash | 75/84.5 |
| 2,942,969 | 6/1960 | Doyle | 75/84.5 |
| 3,269,830 | 8/1966 | Sutherland | 75/84.5 |

*Primary Examiner*—John F. Terapane
*Assistant Examiner*—Matthew A. Thexton
*Attorney, Agent, or Firm*—R. A. Stoltz

[57] ABSTRACT

This is a method for reduction of chlorides of zirconium, hafnium or titanium, and provides a practical method of removing the product metal from the reduction vessel. A seal metal layer is used at the bottom of the vessel. The upper portion of the seal metal layer is liquid and the lower portion is solid. Product metal settles into the liquid portion. Product metal in a matrix of solid seal metal is withdrawn from the bottom of the vessel. Seal metal is predominantly either zinc or tin. Either pure zinc or tin or zinc or tin alloyed with product metal can be recycled to the bottom of the reduction vessel.

17 Claims, 3 Drawing Figures

PROCESS FOR REDUCTION OF ZIRCONIUM, HAFNIUM OR TITANIUM USING A ZINC OR TIN SEAL

CROSS-REFERENCE TO RELATED APPLICATIONS

A method for reduciton of chlorides of reactive metals (zirconium, hafnium, or titanium), is described in related application Ser. No. 739,420 assigned to the same assignee. That related application also uses a seal at the bottom of the reduction vessel, but that seal is accomplished by a means of withdrawing solidified salt (e.g. magnesium chloride) which contains chunks of product metal.

BACKGROUND OF THE INVENTION

The present invention relates to methods for reducing zirconium, hafnium or titanium from a chloride to metallic form, and in particular to a process which lends itself to continuous production.

Zirconium, hafnium and titanium are commonly reduced from the chloride by means of a reducing metal such as magnesium or sodium. At the present time the commercial processes are batch-type processes. U.S. Pat. No. 3,966,460, for example, describes a process of introducing zirconium tetrachloride vapor onto molten magnesium, with the zirconium being reduced and traveling through the magnesium layer to the bottom of the reactor and with the by-product magnesium chloride being periodically removed.

In commercial processes, a portion of the by-product salt (e.g. magnesium chloride) is removed manually after the batch has been completed and cooled, and the remainder of the salt and the remaining excess reducing metal is removed in a distillation or leaching process.

SUMMARY OF THE INVENTION

This is a continuous process for reducing a chloride of zirconium, hafnium or titanium to produce a product metal. It provides a practical way of removing product metal from the reduction vessel. It uses a layer of seal metal at the bottom of the reduction vessel, a layer of molten reducing metal chloride (e.g. magnesium chloride) on top of the seal metal and with a layer of molten reducing metal (e.g. magnesium) on top of the layer of reducing metal chloride. A gaseous chloride of the metal to be produced is introduced above the reducing metal thereby causing a reaction which produces product metal (e.g. zirconium) chunks which settle through the layers of molten reducing metal, reducing metal chloride and seal metal. The lower portion of the seal metal is cooled to maintain this portion solid, thus providing a bottom seal on the vessel. The lower part of the solid seal metal is withdrawn from the vessel, causing some of the molten seal metal to be relocated adjacent to the cooling means and thus to solidify. This maintains the seal at the bottom of the vessel while product metal chunks are trapped within the solidified seal metal and can be withdrawn from the vessel together with solidified seal metal. Preferably, the seal metal is externally separated from the product metal and recycled to the vessel.

DESCRIPTION OF THE PREFERRED EMBODIMENTS

As previously noted, commercial processes for reduction of zirconium, hafnium or titanium chlorides to their metals have been batch-type processes. This is due in large part to the difficulty of removing the product metal during operation. While semicontinuous processes have been proposed (see, for example, J. E. Mauser, "Production of Zirconium by the Semicontinuous Reactor Process" R15759, U.S. Bureau of Mines, 1961; or W. W. Dunham, Jr., and R. D. Toomey, *Journal of Metals*, volume 11, No. 7, July 1959, pages 438–440), the commercial processes have remained as batch type processes. This invention provides for removal of the product metal at least periodically while continuing the reduction process, and preferably, in addition, for turning the product metal into ingot form.

Figure 1:
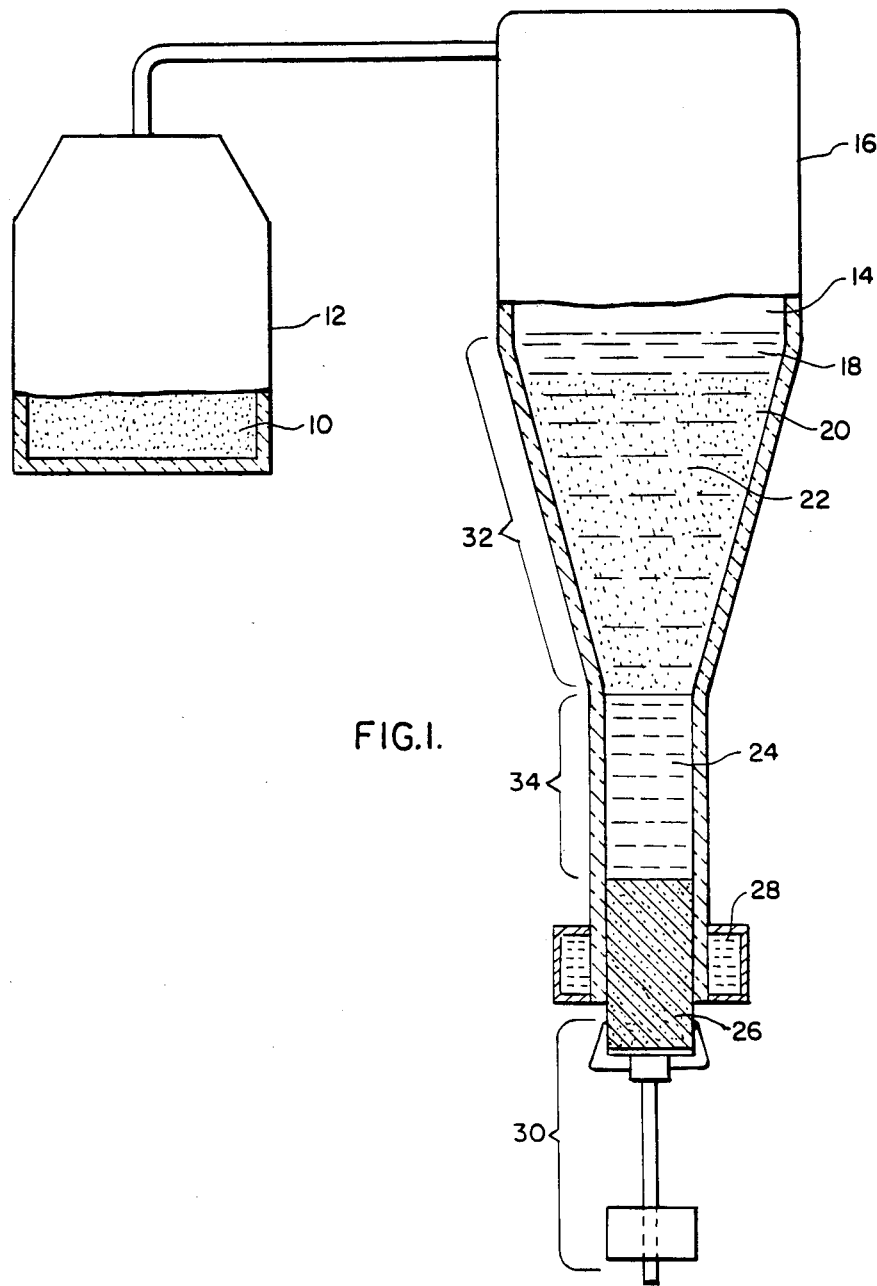
FIG. 1 shows the invention using zirconium tetrachloride being reduced by magnesium and with a zinc-zirconium seal metal.

FIG. 1 shows one embodiment of the invention in which zirconium tetrachloride particles 10 are sublimed in a sublimer vessel 12 and the zirconium tetrachloride vapor 14 is introduced into a reducing vessel 16 where the vapor comes into contact with a layer of molten magnesium 18, reacting to produce chunks of zirconium 20 which settle down through the molten magnesium layer 18 through a layer of magnesium chloride 22 and down through the molten part of a seal metal and come to rest on top of the solid portion of the seal metal. While the seal metal can be initially, for example, pure zinc, zirconium will dissolve in the zinc and the zinc molten portion 24 will contain some (e.g. 10–15 weight percent) zirconium. Under steady state conditions, the solid portion of the seal metal will be zirconium contained in a matrix of zirconium containing zinc. This solid portion 26 provides a seal at the bottom of the vessel 16. Cooling means 28, such as a water jacket, is provided to maintain the lower portion of the seal solid. Withdrawal means 30 is provided to slowly withdraw a portion of the solid zirconium/zinc material from the vessel 16. FIG. 1 shows a vessel 16 with a tapered portion 32 to allow the zirconium chunks 20 to funnel down to the solid molten interface of the seal metal. The portion of the lower cylindrical section 34 in contact with the liquid zinc (or tin) containing seal metal is preferably made of a material such as graphite to generally avoid reactions with the very reactive liquid seal metal.

Figure 2:
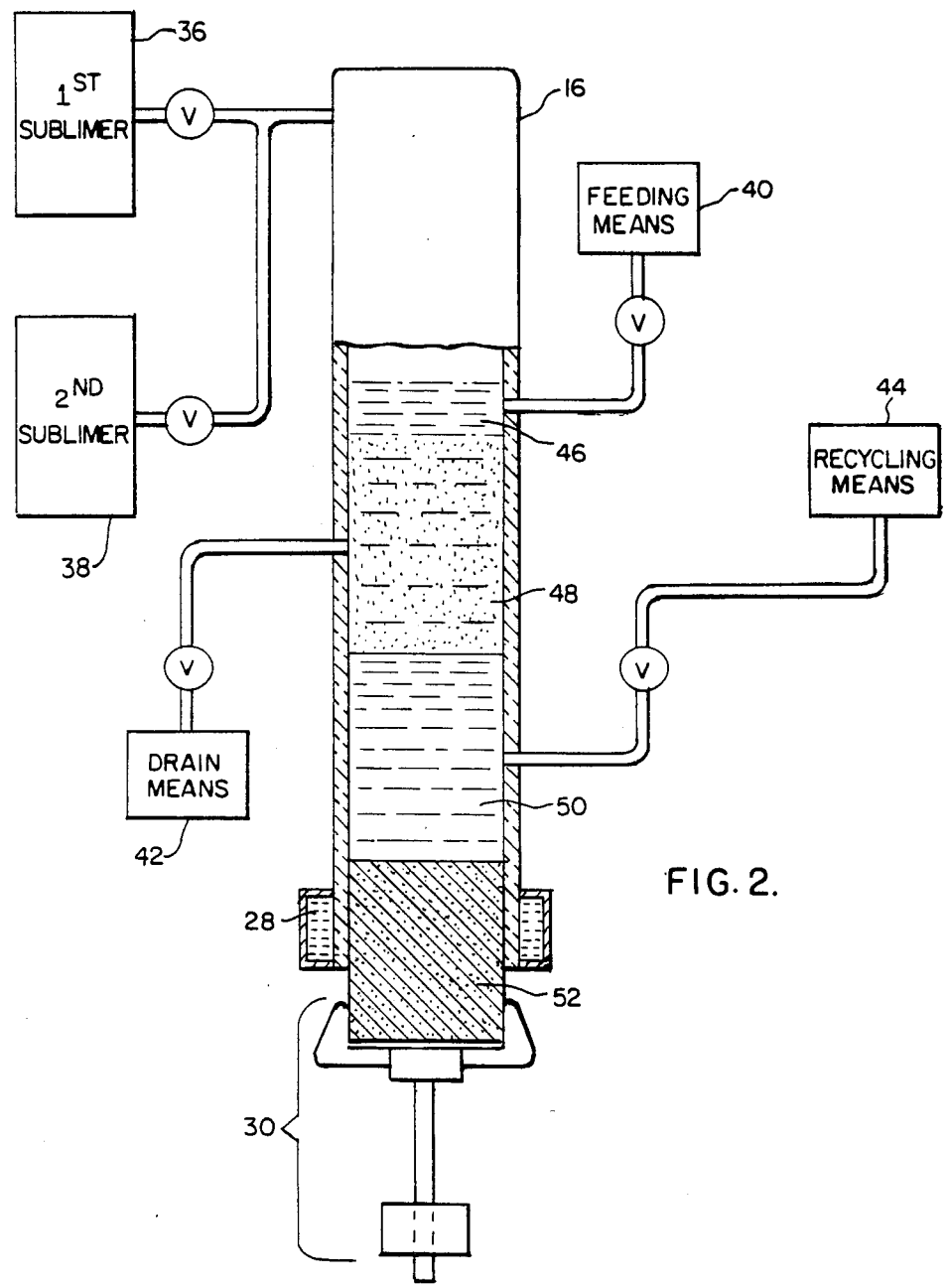
FIG. 2 shows the invention as used in a continuous process.

FIG. 2 shows an embodiment for continuous production. A first sublimer 36 and a second sublimer 38 are used such that one sublimer can be refilled while the other is feeding the vessel 16. Feeding means 40 is used to at least periodically (and possibly continuously) feed reducing metal (e.g. magnesium) into the vessel 16. Drain means 42 is used to at least periodically (and possible continuously) remove reducing metal chloride (e.g. magnesium chloride) from the vessel 16. Recycling means 44 is used to at least periodically (and possibly continuously) introduce seal metal (e.g. zinc or zinc-containing zirconium) into the vessel 16. Preferably, the levels of the reducing metal 46, reducing metal chloride 48, molten seal metal 50 and solid seal metal 52 are maintained relatively constant.

Figure 3:
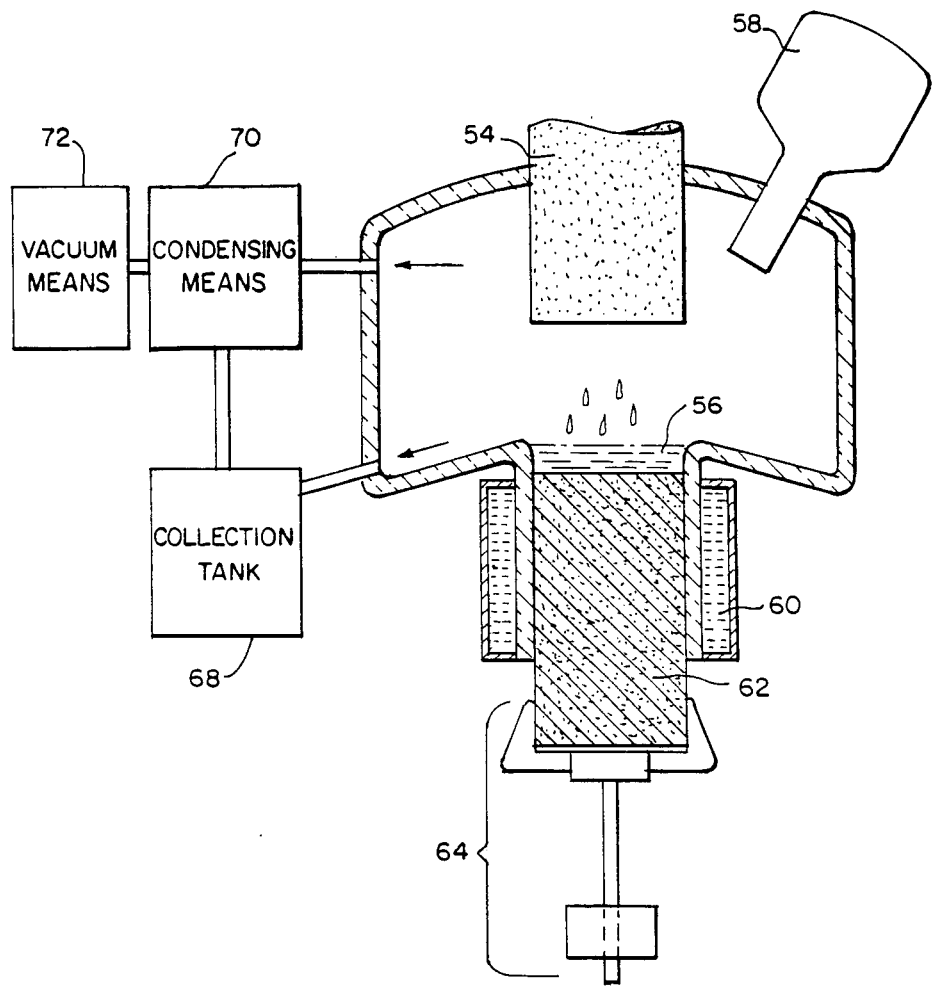
FIG. 3 shows, in simplified form, an electron beam melting beam apparatus for separating zinc, for example, from the product metal.

FIG. 3 is a simplified drawing of an electron beam furnace for removing at least a portion of the seal metal (the zinc or tin) and producing an ingot of relatively pure (although perhaps containing tin if for use in production of Zircaloy alloys) product material.

Again referring to FIG. 2, it can be seen that a log, for example, of zirconium/zinc in solid form will increasingly stick out of the bottom of the vessel 16 and that at some point some of the log can be cut off and removed and the withdrawal mechanism 30 repositioned to attach to the remaining solid portion 52.

This log of zirconium/zinc, for example, can then be melted in the electron beam apparatus of FIG. 3. FIG. 3 shows the cylinder to be melted 54 positioned above a pool of purified product metal 56. The pool 56 is melted by an electron beam gun mechanism 58. Melting proceeds relatively slowly such that the zinc or tin which reached the molten pool 56 will have time to volatilize from the surface of the pool. A cooling jacket 60 is provided to solidify the purified material to produce ingot 62 of purified material. A withdrawal mechanism 64 is attached to the bottom of the ingot 62. The walls of the electron beam chamber 66 are preferably maintained at a temperature above the melting point of the tin or zinc and generally configured such that tin or zinc which condenses on the walls drains to collection tank 68. Zinc or tin vapor is withdrawn through condensing means 70. A vacuum means 72 is provided to maintain a very low pressure in the chamber 66.

Alternately, the cylinder of seal metal/product metal (e.g. zirconium/zinc) can be subjected to a distillation-sintering operation. During this operation, the cylinder is heated to a temperature sufficient to melt off most of the zinc/zirconium alloy which formed the matrix, and distill off any remaining magnesium, allowing the relatively pure zirconium chunks to sinter. The zinc/zirconium alloy is then recycled to the vessel 16 and the porous sintered product material is then melted, for example, in an electron beam furnace. It should be noted that the porous ingot does not allow sealing against its cylindrical sides, thus must be placed entirely within the chamber of the electron beam furnace.

Although the examples have illustrated the invention with zirconium, zinc and magnesium, it can be seen that hafnium or titanium can be similarly processed and that sodium can be substituted for magnesium and that tin can be substituted for zinc.

It should also be noted that zinc and zirconium or titanium, for example, can be separated by distillation as described in U.S. Pat. Nos. 4,127,409, and 4,390,365. After distillation, the log is in sponge form and can be crushed and processed by conventional commercial method (e.g. pressed and double vacuum arc melted).

We claim:

1. In a process of the type wherein a chloride of zirconium, hafnium or titanium is reduced to produce a product metal, the improvement comprising:
   a. establishing a layer of a seal metal selected from the group consisting of zinc, zinc together with product metal, tin and tin together with product metal in a vessel, said seal metal layer having an upper molten portion and a lower solid portion, said lower solid portion being located adjacent to a cooling means;
   b. establishing a layer of molten magnesium chloride on top of said seal metal;
   c. establishing a layer of molten magnesium on top of said layer of magnesium chloride;
   d. introducing gaseous chloride of the product metal above said magnesium, thereby causing a reaction which produces product metal chunks which settle through said layers of molten magnesium, molten magnesium chloride and molten seal metal;
   e. withdrawing a lower part of said solid seal metal from said vessel and causing a portion of the molten seal metal to be relocated adjacent to said cooling means, whereby the portion of the molten seal metal relocated adjacent to the cooling means solidifies and maintains a seal at the bottom of the vessel while product metal chunks are trapped within the solidified seal metal and can be later withdrawn from said vessel together with solidified seal metal.

2. The process of claim 1, wherein at least a portion of seal metal which has been withdrawn from said vessel is separated from at least a portion of the product metal and is recycled to the vessel.

3. The process of claim 2, wherein the seal metal is zinc and product metal and zinc is separated from the product metal and zinc is recycled to the vessel.

4. The process of claim 2, wherein the seal metal is zinc and product metal and zinc and product metal are separated from the remainder of the product metal and zinc and product are recycled to the vessel.

5. The process of claim 2, wherein magnesium chloride is at least periodically withdrawn from said vessel.

6. The process of claim 5, wherein magnesium is at least periodically added to said vessel, whereby said process becomes a continuous process.

7. The process of claim 6, wherein said product metal is zirconium.

8. The process of claim 4, wherein seal metal containing product metal chunks which has been withdrawn is electron beam melted in a chamber, vaporizing the zinc and thereby separating said zinc from the product metal, and wherein the zinc vapor is condensed and recycled to the vessel.

9. In a process of the type wherein a chloride of zirconium, hafnium or titanium is reduced to produce a product metal, the improvement comprising:
   a. establishing a layer of a seal metal selected from the group consisting of zinc, zinc together with product metal, tin and tin together with product metal in a vessel, said seal metal layer having an upper molten portion and a lower solid portion, said lower solid portion being located adjacent to a cooling means;
   b. establishing a layer of molten reducing metal chloride on top of said seal metal;
   c. establishing a layer of molten reducing metal on top of said layer of reducing metal chloride;
   d. introducing gaseous chloride of the product metal above said reducing metal, thereby causing a reaction which produces product metal chunks which settle through said layers of molten reducing metal, reducing metal chloride and seal metal;
   e. withdrawing a lower part of said solid seal metal from said vessel and causing a portion of the molten seal metal to be relocated adjacent to said cooling means, whereby the portion of the molten seal metal relocated adjacent to the cooling means solidifies and maintains a seal at the bottom of the vessel while product metal chunks are trapped within the solidified seal metal and can be later withdrawn from said vessel together with solidified seal metal.

10. The process of claim 9, wherein at least a portion of seal metal which has been withdrawn from said vessel is separated from at least a portion of the product metal and is recycled to the vessel.

11. The process of claim 10, wherein the seal metal is zinc and product metal and zinc is separated from the product metal and zinc is recycled to the vessel.

12. The process of claim 10, wherein the seal metal is zinc and product metal and zinc and product metal are separated from the remainder of the product metal and zinc and product metal are recycled to the vessel.

13. The process of claim 10, wherein reducing metal chloride is at least periodically withdrawn from said vessel.

14. The process of claim 13, wherein reducing metal is at least periodically added to said vessel, whereby said process becomes a continuous process.

15. The process of claim 14, wherein said product metal is zirconium.

16. The process of claim 10, wherein seal metal containing product metal chunks which has been withdrawn is electron beam melted in a chamber, vaporizing the zinc and thereby separating said zinc from the product metal, and wherein the zinc vapor is condensed and recycled to the vessel.

17. In a process of the type wherein a chloride of zirconium, hafnium or titanium is reduced to produce a product metal, the improvement comprising:
   a. establishing a layer of zinc together with product metal seal metal in a vessel, said seal metal layer having an upper molten portion and a lower solid portion, said lower solid portion being located adjacent to a cooling means;
   b. establishing a layer of molten magnesium chloride on top of said seal metal;
   c. establishing a layer of molten magnesium on top of said layer of magnesium chloride;
   d. introducing gaseous chloride of the product metal above said magnesium, thereby causing a reaction which produces product metal chunks which settle through said layers of molten magnesium, molten magnesium chloride and molten seal metal;
   e. withdrawing a lower part of said solid seal metal from said vessel and causing a portion of the molten metal to be relocated adjacent to said cooling means, causing the portion of the molten seal metal relocated adjacent to the cooling means to solidify and maintain a seal at the bottom of the vessel, whereby while product metal chunks are trapped within the solidified seal metal and can be later withdrawn from said vessel together with solidified seal metal;
   f. at least periodically withdrawing magnesium chloride from said vessel;
   g. at least periodically adding magnesium to said vessel;
   h. electron beam melting zinc containing product metal chunks in a chamber, vaporizing the zinc and thereby separating said zinc from the product metal; and
   i. condensing said zinc vapor and recycling zinc to said vessel.

* * * * *